(12) United States Patent
Stageberg et al.

(10) Patent No.: US 6,301,076 B1
(45) Date of Patent: Oct. 9, 2001

(54) NARROW TRACK INDUCTIVE WRITE HEAD HAVING A TWO-PIECE POLE

(75) Inventors: Frank E. Stageberg, Edina; Kenneth P. Ash, Chanhassen; James K. Price, Tonka Bay; Feng Wang, Lakeville; Elzbieta J. Haftek, Eden Prairie; Allan E. Schultz, St. Paul; Richard P. Larson, Brooklyn Park, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/246,448

(22) Filed: Feb. 9, 1999

Related U.S. Application Data

(60) Provisional application No. 60/078,904, filed on Mar. 20, 1998.

(51) Int. Cl.[7] .................................................. G11B 5/147
(52) U.S. Cl. ............................................................. 360/126
(58) Field of Search ..................................... 360/317, 318, 360/121, 125, 126

(56) References Cited

U.S. PATENT DOCUMENTS

| | | | |
|---|---|---|---|
| 5,805,391 | * 9/1998 | Chang et al. | 360/126 |
| 5,969,911 | * 10/1999 | Hikami et al. | 360/317 |
| 6,018,862 | * 2/2000 | Stageberg et al. | 360/126 |
| 6,104,576 | * 8/2000 | Santini | 360/126 |

* cited by examiner

Primary Examiner—Allen Cao
(74) Attorney, Agent, or Firm—Kinney & Lange, P.A.

(57) ABSTRACT

A two-piece pole for an inductive write head has a first pole piece in the tip region contiguous the gap and confronting the other pole across the gap. The first pole piece has a width defining the gap width of the write head at the air bearing surface. A second pole piece is connected to the first pole piece and extends to the back gap. At least a portion of the second pole piece is connected to the first pole piece and has a width larger than the width of the first pole piece. The second pole piece means has surfaces within the pole tip region that intersect at external corners facing the gap, at least two surfaces of each of these external corners being joined at an obtuse angle so that none of said external corner is a sharp external corner, thereby minimizing fringe fields. In one form, a pole cap between the first and second pole pieces has a trapezoidal configuration forming the obtuse angles.

12 Claims, 7 Drawing Sheets

NARROW TRACK INDUCTIVE WRITE HEAD HAVING A TWO-PIECE POLE

CROSS-REFERENCE TO RELATED APPLICATION

This application claims benefit of Provisional Application No. 60/078,904 filed Mar. 20, 1998 for "Two Piece Pole Narrow Track Writer" by Frank E. Stageberg, Kenneth P. Ash, James K. Price, Feng Wang, Elzbieta J. Haftek, Allan E. Schultz and Richard P. Larson.

BACKGROUND OF THE INVENTION

This invention relates to inductive write heads, and particularly to thin film inductive write heads having a two-piece pole.

Inductive write heads are formed by a pair of magnetic poles that are joined at a back region, and separated by a small insulation layer forming a front or transducing gap at the air bearing surface (ABS). Coils embedded in the insulation material between the poles permit writing of data to a recording surface adjacent the ABS. Current flowing through the coils induces a magnetic flux in the poles, generating a magnetic field adjacent the gap at the ABS which induces the recording of data on the adjacent moving magnetic media. Currently, inmost read heads are magnii-etoresistive heads, not inductive heads, as inductive head technology is almost exclusively directed lo write heads. Accordingly, although the invention will be described in connection with a write head, it is understood that the invention is equally applicable to inductive read heads.

There is a continuing need in the data recording art to increase the data density, and hence the capacity of magnetic discs of magnetic disc drives. Data density is increased by making the concentric tracks more narrow, thereby increasing the number of tracks per radial inch, and by decreasing the length of the bit cell along the track, thereby increasing the number of bit cells per track. Both track width and bit cell length are factors of the geometry of the write head, and its ability to write data to the track. More particularly, the track width is largely dictated by the width of the wrilt the length of a bit cell is largely dictated by the length the write gap and the coil current switching interval. By coil,ciltioii, gap width is defined as the width of the gap across the head in the general direction of the radial width of the track. Gap length is defined as the length between opposing poles of the head, generally along the length of the track. Gap height is the direction orthogonal to both the length and width of the gap, and is a distance from the ABS into the head. Commonly, the height of a gap is called the throat height which is the distance between the ABS and a "zero throat position" where both of the two pole layers converge at the transducing gap. If one pole converges to the gap level at a location different from the other pole, the zero throat position is the location at the convergence of the pole closest to the ABS. Typically, the zero throat position is 1 or 2 $\mu$m from the ABS.

Narrow track widths are achieved by use of narrow poles at the gap of the write head. However, the pole width must be large in the paddle region of the head where the coil passes between the poles. The larger pole width is necessary to gain adequate magnetic flux through the poles by the coil write current. Hence, it is common to taper the poles from a large width in the paddle region to a narrow width at the ABS. To achieve even narrower widths, two-piece poles have been introduced that employ a first pole piece having a very narrow width at the ABS, and a second pole piece connected to the first pole piece and extending to the back region of the head. Thus, the first pole piece defines the narrow track width, and the second pole piece links through the coils and connects to the other (e.g., bottom) pole. An example of a two-piece pole may be found in U.S. Pat. No. 5,452,164 issued to Cole et al.

The second pole piece of a two-piece pole is wider at the ABS that the first pole piece. As a result, sharp corners are formed in the second pole piece at the ABS. These sharp corners produce large fringe magnetic fields during the write process, thereby adversely affecting the quality of the recording of data. More particularly, the fringe field may adversely affect data recorded on adjacent tracks by re-writing magnetic transitions.

BRIEF SUMMARY OF THE INVENTION

The present invention is directed to a two-piece pole for an inductive write head in which a first pole piece at the air bearing surface extends between the air bearing surface and the zero throat position contiguous the gap and confronting the tip region of the other pole across the gap. The first pole piece has a width defining a gap width of the write head at the air bearing surface. A second pole piece is connected to the first pole piece and extends to the back gap. At least a portion of the second pole piece is connected to the first pole piece and has a width larger than the width of the first pole piece. The second pole piece is connected to the first pole piece so that no sharp external corners exists between the first and second pole pieces within the pole tip region.

In one form of the invention, the second pole piece is recessed from the air bearing surface.

In another form of the invention, the first and second pole pieces are joined within the pole tip region and the second pole piece includes surfaces that intersect with surfaces of the first pole piece at external corners, with at least two of the surfaces of each external corner within the pole tip region being joined at an obtuse angle so that none of the external corners within the pole tip region is a sharp external corner. Conveniently, the second pole piece extends to the air bearing surface and has a surface intersecting the air bearing surface at an acute angle.

In another form of the invention, a pole cap has a trapezoidal configuration at the air bearing surface forming two opposite substantially parallel surfaces of unequal length and two non-parallel surfaces between the two parallel surfaces, such that the length of a shorter of the two parallel surfaces is contiguous the first pole piece and the longer of the two parallel surfaces is contiguous the second pole piece. Bach non-parallel surface is at an obtuse angle to the shorter of the parallel surfaces.

Another aspect of the invention resides in a process of forming a two-piece pole for an inductive write head. A first pole piece is formed with a width between opposite side surfaces defining a width of a transducing gap at an air bearing surface of the write head. A second pole piece is formed having a first region remote from the air bearing surface and a second region extending from the first region toward the air bearing surface. The first region is wider than the width of the first pole piece. At least a portion of the second pole piece is connected to the first pole piece so that no sharp external corners exists between the first and second pole pieces within the pole tip region.

In one aspect of this form of the process, the first and second pole pieces are joined within the pole tip region and the second pole piece includes surfaces that intersect with surfaces of the first pole piece at external corners, with at least two of the surfaces of each external corner within the pole tip region being joined at an obtuse angle so that none of the external corners within the pole tip region is a sharp external corner.

In another form of the process, a pole piece cap is formed on the first pole piece. The cap has a trapezoidal shape with opposite side surfaces arranged at respective obtuse angles to a length of the transducing and the shorter of the parallel surfaces being contiguous the first pole piece. The second pole piece is formed such that a region of the second pole piece having a width greater than the width of the first pole piece and smaller than the width of the longer of the parallel surfaces is contiguous the longer of the parallel surfaces of the pole piece cap.

DETAILED DESCRIPTION

Figure 2:
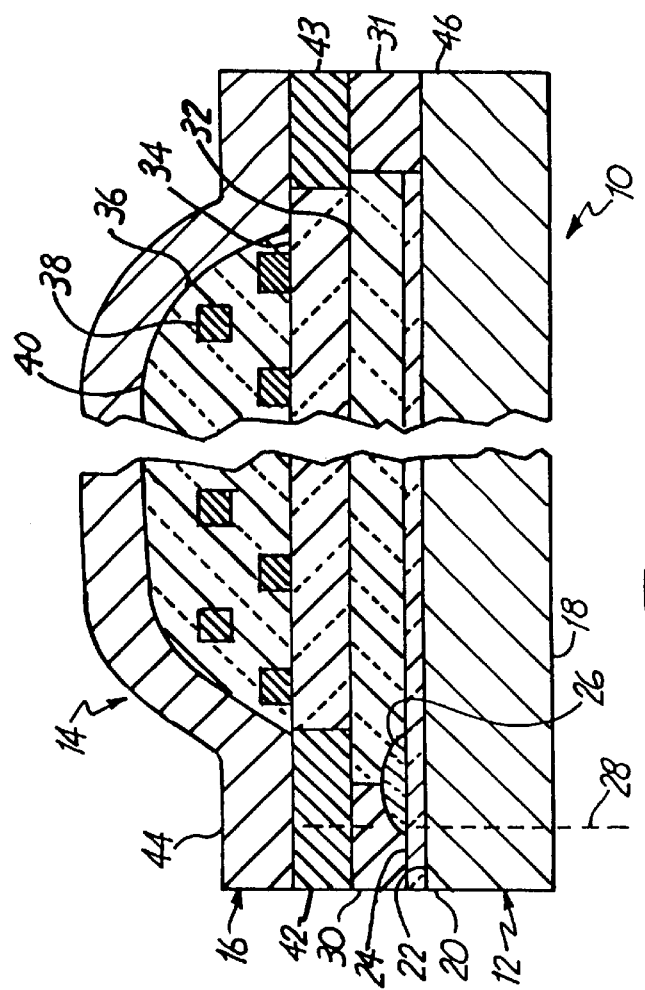
FIG. 2 is a section view taken at line 2—2 in FIG. 1, of the gap portion of an inductive write head in accordance with one form of the present invention.
Figure 1:
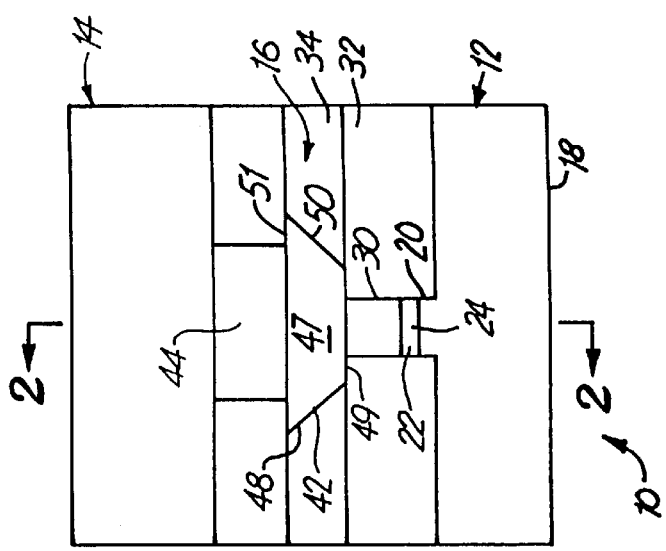
FIG. 1 is a frontal view.

FIGS. 1 and 2 illustrate a write head 10 having a bottom pole piece 12 and top pole piece 14 extending to air bearing surface (ABS) 16. Bottom pole piece 12 may comprise a layer 18 and a mesa 20, both of magnetic material such as permalloy, with mesa 20 defining surface 22 to confront the top pole at the ABS. Surface 22 is accurately defined during the fabrication process. Depending on the design of the entire head, bottom pole 12 may be shared with an adjacent magnetoresistive read head (not shown) and serve as a shield layer therefore.

Insulating gap layer 24 is formed over layer 18 and mesa 20. A zero throat insulator is formed on gap layer 24 to define the zero throat position 28 where insulator 26 meets gap layer 24 closest to the ABS. First top pole piece 30 is formed on the top surface of gap layer 24 at the ABS and extends at least to zero throat position 28. Similarly, pole piece 31 is formed at the back gap 46 on bottom pole 20. First top pole piece 30 and pole piece 31 are formed of a suitable magnetic material, such as 45/55 NiFe permalloy having high flux density saturation. The top surface of gap layer 24 is critically located in the region of the pole tip between ABS 16 and zero throat position 28 to precisely position first top pole piece 30 and the thickness (length) of the gap formed between pole piece 30 and mesa 20. Insulator layer 32 is formed over layer 18 between first top pole piece 30 at the ABS and pole piece 31 at back gap 46. Top pole cap 42 is formed over first top pole piece 30, and optionally also over a portion of insulator layer 32, and pole cap 43 is formed on pole piece 31 at the back gap. Insulating layer 34 is formed on layer 32 between caps 42 and 43, and insulating layer 36 encloses coils 38 to define a "hill" region 40 of the head. A second top pole piece 44 is formed over hill 40 and across the top surface of top pole caps 42 and 43. Caps 42 and 43 and pole piece 44 are constructed of the same magnetic material forming first top pole piece 30. Both pole pieces 18 and 44 extend from the ABS to the back of the head where they converge and join at back gap 46, closing the magnetic circuit formed by the poles. By convention, the region between ABS 16 and zero throat position 28 is called the pole tip, and the region between zero throat position 28 and back gap 46 is called the back region.

One of the difficulties associated with inductive write heads is the development of fringe fields that adversely affect the recording characteristics. More particularly, strong fringe fields may develop if sharp external corners (i.e., at three surfaces) of either pole of the recording head exists in the path of the magnetic flux in the circuit within the pole tip region not contiguous to the gap. A "sharp external corner" is one where three surfaces of the pole join at angles between each two surfaces through the material of the pole of 90° or less. A corner is in the flux path if it "faces" the gap such that all three surfaces forming the corner directly face the gap without intervening pole material. Thus, magnetic flux is not channeled away from such a corner by the pole material in the path toward the gap. Instead, flux confronting such a corner forms a fringe field outside the pole. If these fringe fields are strong enough, they may interfere with data being recorded in the present track, or with data recorded on adjacent tracks, thereby adversely affecting the recording on the adjacent recording media. It is important, therefore, to minimize the strength of fringe fields associated with magnetic recording heads.

In the head illustrated in FIGS. 1 and 2, second top pole piece 44 is wider than the first top pole piece 30 confronting mesa 20 across the gap. Top pole cap 42 provides a transition between the differing widths of the first and second top pole pieces with surfaces so that any sharp external corners (having external angles 90° or less) are sufficiently far from the gap to minimize or eliminate fringing fields at the gap. In the embodiment of FIGS. 1 and 2, top pole cap 42 has sloped surfaces 48 and 50 within the pole tip region to define a trapezoidal shaped cap with the sloped surfaces 48 and 50. Sloped sur faces 48 and 50 serve to direct magnetic flux along a path between the wider second top pole piece 44 and narrower first top pole piece 30, thereby minimizing flinge fields. Sloped surface 48 forms a corner with shorter parallel surface 49 and surface 47 coincident with the ABS, and sloped surface 50 forms a corner with shorter parallel surface 49 and surface 47. While the angles between surfaces 47 and 48 and between surfaces 47 and 49 are 90°, the obtuse angle between surfaces 48 and 49 minimize fringe fields at the corners. Likewise, while the angles between surfaces 47 and 50 and between surfaces 47 and 49 are 90°, the obtuse angle between surfaces 50 and 49 minimize fringe fields at the corners. Each surface 48 and 50 also forms an acute angle to the longer parallel surface 51 contiguous second top pole piece 44, which is oriented approximately 90° from surface 47, forming sharp external corners. However, these corners are remote from the gap so that any fringing created at those corners do not adversely affect recording at the gap. While a small amount of fringing may occur at these corners, fringing is minimal since the corners are distal from the main magnetic circuit through the pole pieces and cap. As shown particularly in FIG. 1, second top pole piece 44 is more narrow in the pole tip region than the contiguous longer parallel side of pole cap 42. The junction between surface 49 and first top pole piece 30 is a not a sharp external corner, thus minimizing fringe fields. Thus, the head of FIGS. 1 and 2 contains no external sharp corners near or contiguous the gap. It is desired that the angle be as great as practical, approaching 180°, and greater than about 120° and most preferably greater than 150°.

Figure 3:
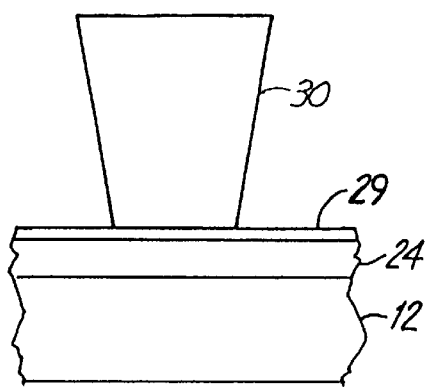
FIGS. 3–10, are frontal views illustrating a process for construction of the head illustrated in FIGS. 1 and 2.
Figure 4:
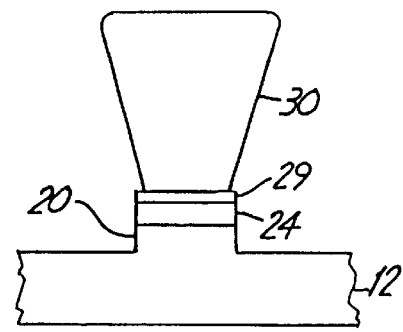
Figure 5:
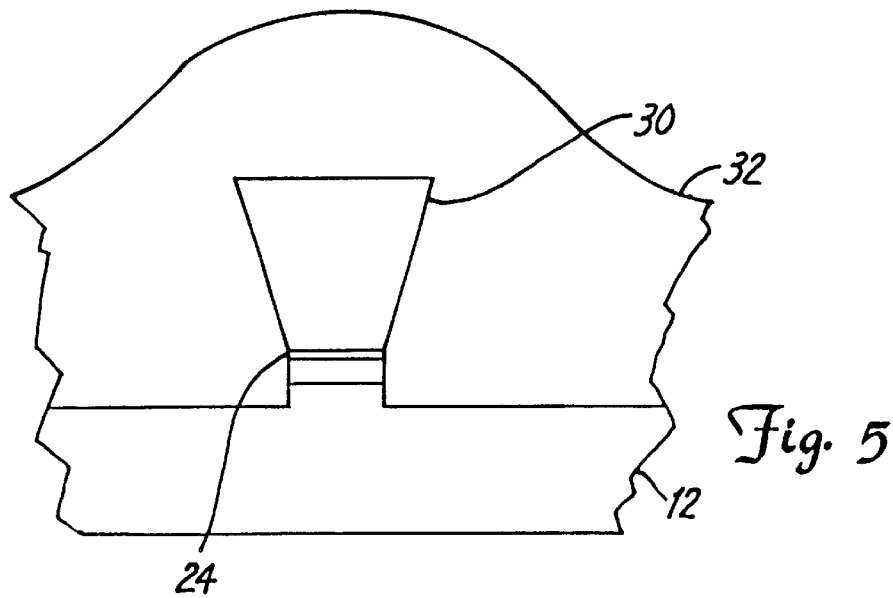
Figure 6:
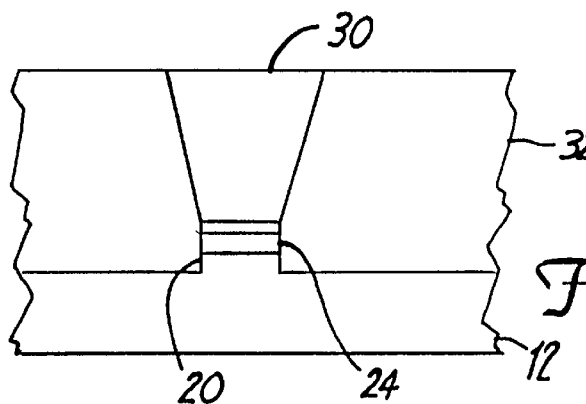
Figure 7:
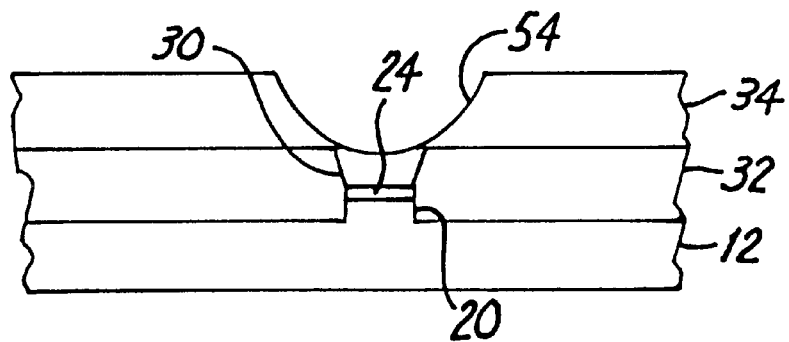
Figure 8:
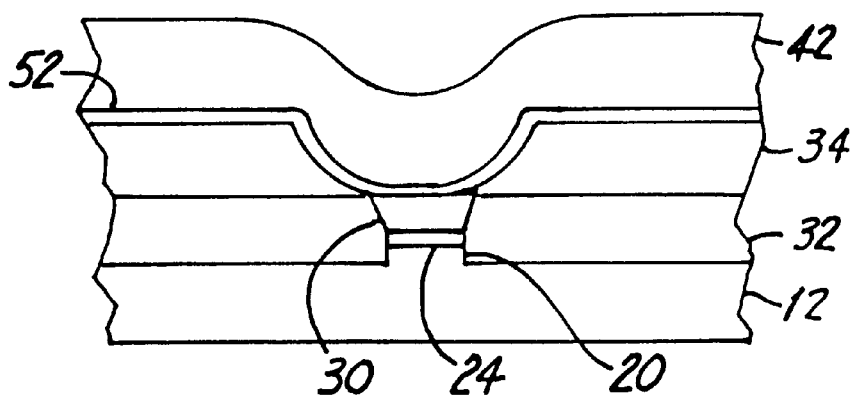
Figure 9:
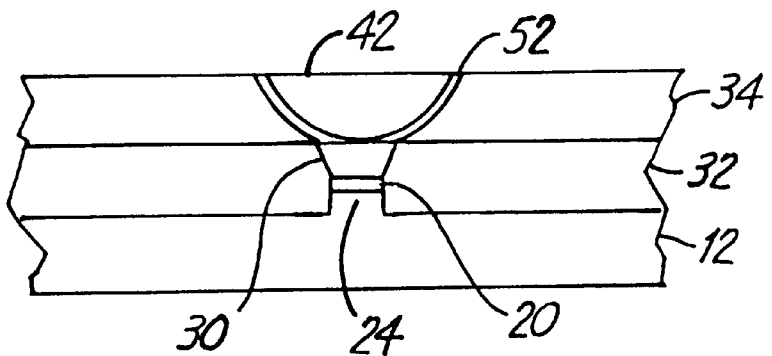
Figure 10:
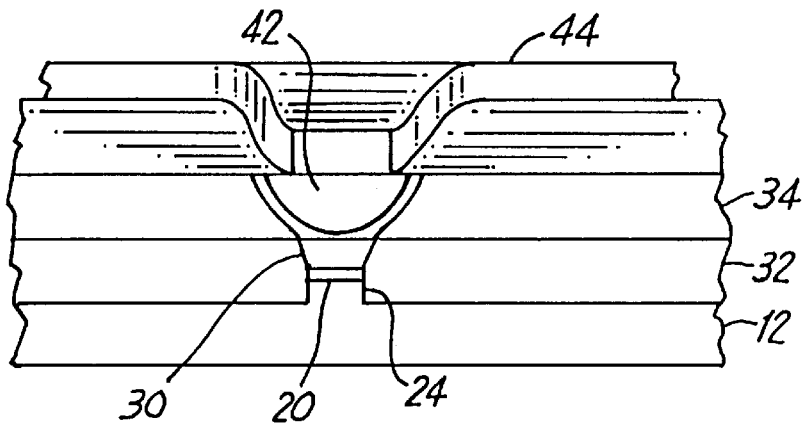
Figure 11:
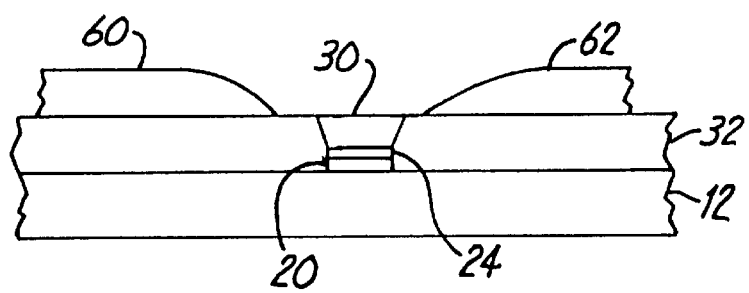
FIGS. 11–14 are frontal views illustrating an alternative process for forming the head illustrated in FIGS. 1 and 2.

A process for forming the write head illustrated in FIGS. 1 and 2 is illustrated in FIGS. 3–10. As shown in FIG. 3 a layer 12 of magnetic material is formed, such as on a substrate or a portion of a magnetoresistive read head (not shown). The magnetic material may be permalloy and preferably includes a high $\beta_{sat}$ portion at the upper surface (which will form mesa 20). A layer 24 of insulating gap material, such as $Al_2O_3$, is deposited on layer 12 to a design thickness to define the length of the gap. Zero throat insulator 26 (FIG. 2) is formed on layer 24, and a seedlayer 29 of high $\beta_{sat}$ permalloy is formed on layer 24 and insulator 26. A layer 30 of high $\beta_{sat}$ pentalloy is plated through a photoresist mask (not shown) to complete the structure shown in FIG. 3. As shown in FIG. 4, the structure is then ion milled to reduce the height of layer 30 and to etch though seedlayer 29 and gap layer 24 into layer 12 at the sides of layer 30, thereby forming mesa 20 and defining the width of the gap. Since zero throat insulator 26 at the back of the gap is not ion etched, the depth of the gap is defined by insulator 26 (FIG. 2). As shown in FIG. 5 a layer 32 of insulating material such as $Al_2O_3$ is deposited over the structure and the structure is milled and polished to a planar surface as shown in FIG. 6. As shown in FIG. 7, insulator material 34 is formed on layer 32 and patterned to form bowl 54 having sloped walls exposing top pole piece 30. As shown in FIG. 8, a seedlayer 52 of high $\beta_{sat}$ permalloy is plated overlayer 34, including in bowl 54, and a layer 42 of magnetic material is plated over seedlayer 52, including in bowl 54. As shown in FIG. 9 layer 42 is ion milled to a depth at least as great as the top surface of layer 34. thereby milling away seedlayer 52 outside of bowl 54 and forming cap 42 in bowl 54. The ion milling process might conveniently also mill a small portion of layer 43 to mill cap 42 to a desired height. Coils 38 and insulating layer 36 (FIG. 2) are added in a manner well-known in the art, thereby forming the hill portion of the head, and second top pole piece 44 is formed overthe hill portion contiguous to cap 42. As shown in FIG. 10 second top pole piece 44 is in the shape of a paddle in the region of the hill and coils, in a manner well-known in the art.

Figure 12:
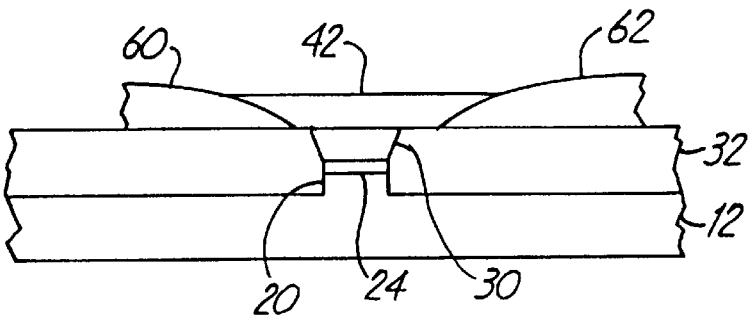
Figure 13:
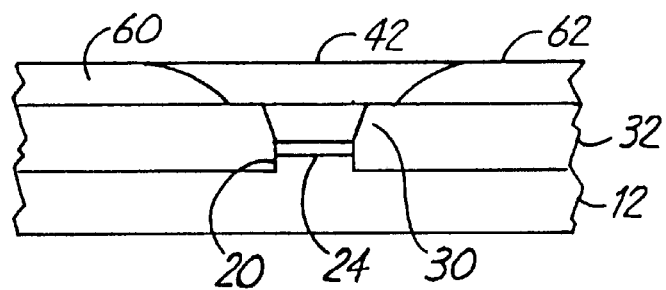
Figure 14:
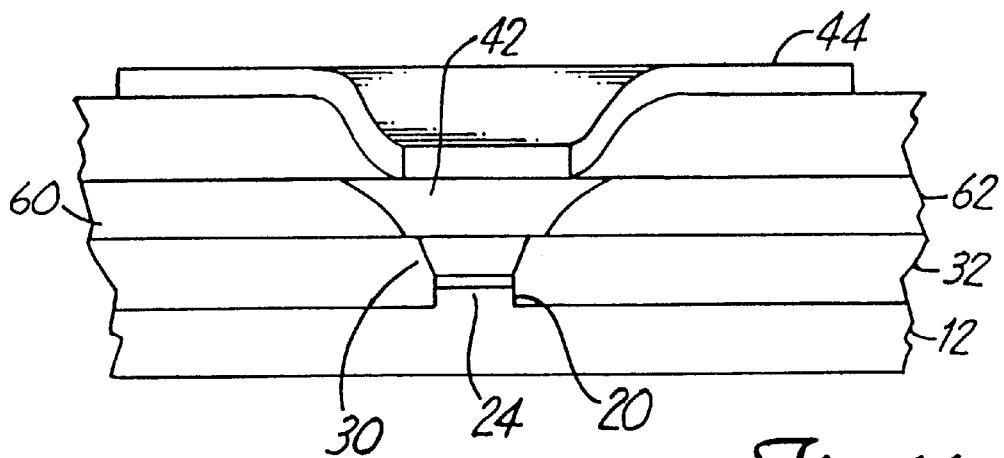

FIGS. 11–14 illustrate an alternative process for forming the head illustrated in FIGS. 1 and 2. Starting with the structure illustrated in FIG. 6, insulating layers 60 and 62 are formed with sloped surfaces on the top surface of layer 32 adjacent each side of first top pole piece 30. Top pole cap 42 is plated over at least a portion of the sloped surfaces of layers 60 and 62, as well as the top surface of insulation layer 32 and the exposed surface of first top pole piece 30 between layers 60 and 62 (FIG. 12). Insulating layer 64 is formed over the structure and milled to expose a top surface of top pole cap 42 (FIG. 13). Top pole piece 44 is then formed on layer 64 and cap 42 (FIG. 14), and the top poles and coils are encapsulated with insulating material in a manner well-known in the art.

Figure 15:
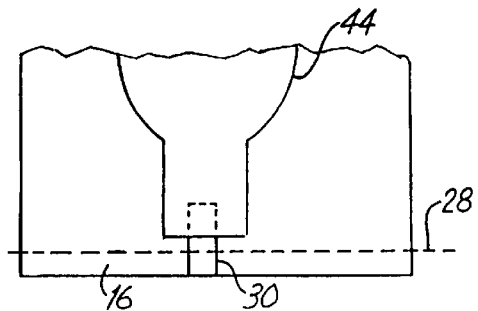
FIGS. 15 and 16 are top and frontal views, respectively, of a first modification of the head according to the present invention.
Figure 16:
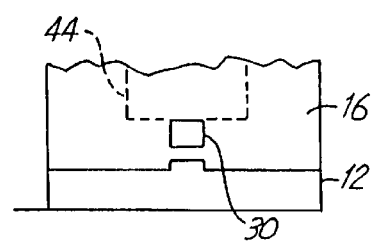

As described above, it is important that sharp external corners be avoided in the poles within the pole tip region at locations contiguous to or near the gap. FIGS. 15–22 illustrate techniques for achieving direct connection between the first and second top pole pieces of differing widths, thereby eliminating the need for pole cap 42, without introducing sharp external angles at the gap. FIGS. 15 and 16 illustrate a first version of a head without a cap in which the top pole piece 44 is attached to top pole piece 30 at a location removed from ABS 16, outside the pole tip region and in the back region of the head. Thus, sharp corners are avoided in the pole tip region by connecting pole pieces 30 and 44 in the back region outside the pole tip region.

Figure 17:
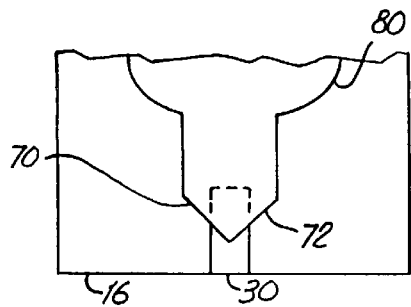
FIGS. 17 and 18 are top and frontal views, respectively, of a second modification of a head according to the present invention.
Figure 18:
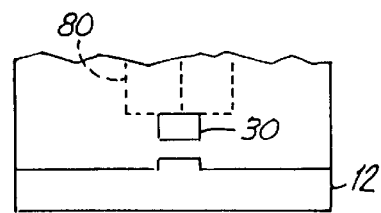
Figure 19:
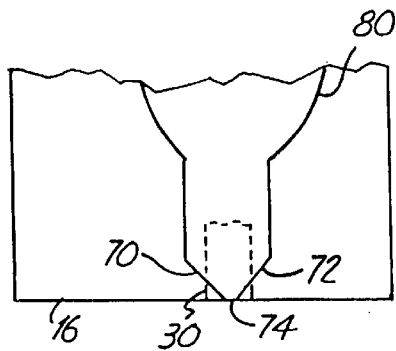
FIGS. 19 and 20 are top and frontal views, respectively, of a third modification of a head according to the present invention.
Figure 20:
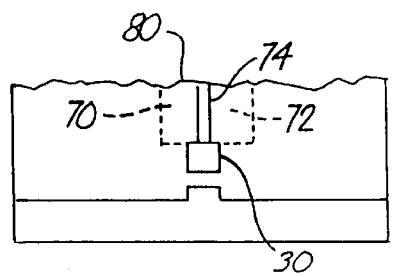

FIGS. 17 and 18 illustrate another modification in which second top pole piece 80 includes surfaces 70 and 72 joined at obtuse angles to the wider sides of the second top pole piece. Surfaces 70 and 72 are also joined at obtuse angles to the sides of first top pole piece 30. The obtuse angle permit the use of the wider second top pole piece contiguous to first top pole piece 30 without introducing sharp angles facing the gap. In the version of FIGS. 17 and 18, pole piece 80 is recessed from ABS 16. FIGS. 19 and 20 illustrate a similar modification as in FIGS. 17 and 18, except that top pole piece 80 extends to ABS 16 such that surfaces 70 and 72 form obtuse angles to surface 74 of pole piece 80 flush with ABS 16.

Figure 21:
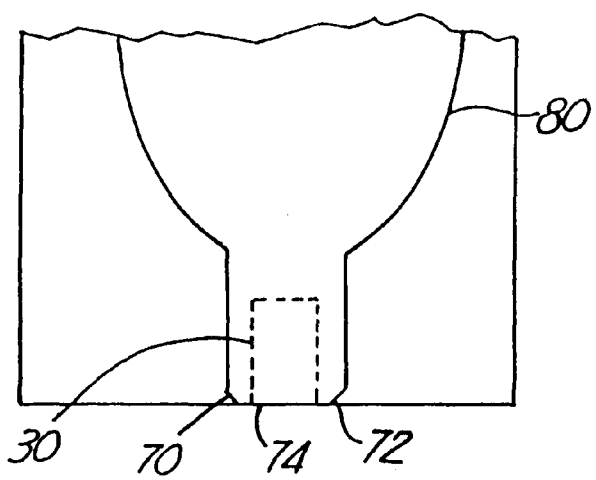
FIGS. 21 and 22 are top and frontal views, respectively, of a fourth modification of a head according to the present invention.
Figure 22:
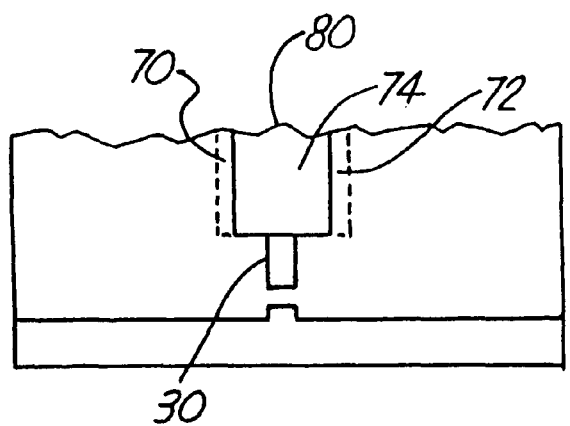

FIGS. 21 and 22 illustrate another modification, similar to those illustrated in FIGS. 17 and 18 and in FIGS. 19 and 20, except top pole piece 80 extends so that surface 74 is wider at the ABS than first top pole piece 30. Nevertheless, the obtuse angle formed between surfaces 70 and 74 and between surfaces 72 and 74 avoid introduction of sharp angles facing the gap that would cause fringing interfering with performance of the head.

In each case of the embodiments of FIGS. 15–22, sloped surfaces 70 and 74 direct the flux between the first and second top pole pieces without introduction of sharp corners at or near the gap and ABS that may introduce fringing that would adversely affect performance of the write head. More particularly, it is desired that the angle be as great as practical, approaching 180°, and greater than about 120° arid most preferably Treater than 150°.

Although the present invention has been described with reference to preferred embodiments, workers skilled in the art will recognize that changes may be made in form and detail without departing from the spirit and scope of the invention.

What is claimed is:

1. An inductive write head having a bottom magnetic pole having a tip region that extends from a substantially planar air bearing surface to a zero throat position and a back region that extends from the zero throat position to a back gap, a top magnetic pole having a tip region extending from the air bearing surface to the zero throat position and a paddle region that extends from the zero throat position to the back gap, and a layer of insulating material forming a gap at the air bearing surface sandwiched between the tip regions of the bottom and top magnetic poles, the top magnetic pole comprising a first pole piece at the air bearing surface extending between the air bearing surface and the zero throat position contiguous the layer of insulating material and confionting the tip region of the bottom magnetic pole across the gap, the first pole piece having a width defining a gap width of the head at the air beating surface, and second pole piece means connected to the first pole piece and extending to the back gap, at least a portion of the second pole piece means that is connected to the first pole piece having a width larger than the width of the first pole piece, the second pole piece means being connected to the first pole tip piece so that no sharp external corners exist between the first pole tip piece and the second pole piece within the pole tip region.

2. The write head of claim 1, wherein the second pole piece means comprises a second pole piece entirely recessed fromt the air bearing surface.

3. The write head of claim 2, the second pole piece has first and second side surfaces joined at an obtuse angle and extending toward the zero throat position, the first and second side surfaces extending to a width recessed from the air bearing surface wider than the gap width.

4. The write head of claim 1 wherein the second pole piece means is at least partially within the pole tip region and includes surfaces that intersect with surfaces of the first pole piece within the pole tip region at external corners, at least two surfaces of each external corner within the pole tip region being joined at an obtuse angle so that none of the external corners within the pole tip region is a sharp external corner.

5. The write head of claim 4, wherein the second pole piece means comprises a second pole piece extending to the air bearing surface and having a surface intersecting the air bearing surface at an acute angle.

6. The write head of claim 5, wherein the width of the second pole piece at the zero throat position is greater than the gap width at the air bearing surface.

7. The write head of claim 5, wherein the second pole piece has a surface at the air bearing surface smaller than the gap width, and the second pole piece has first and second side surfaces intersecting the air bearing surface and extending toward the zero throat position at the obtuse angle to the surface of the second pole piece at the air bearing surface to a width wider than the gap width.

8. The write head of claim 5, wherein the second pole piece has a surface at the air bearing surface larger than the gap width, and the second pole piece has first and second side surfaces intersecting the air bearing surface and extending toward the zero throat position at the obtuse angle to the surface of the second pole piece at the air beating surface to a width wider than the surface of the second pole piece at the air bearing surface.

9. The write head of claim 4, wherein the width of the second pole piece means at the zero throat position is greater than the gap width at the air bearing surface.

10. The write head of claim 4, wherein the second pole piece means comprises
  a pole cap at the air bearing surface contiguous the first pole piece, the pole cap having a trapezoidal configuration at the air bearing surface forming two opposite substantially parallel surfaces of unequal length and two non-parallel surfaces between the two parallel surfaces, such that the length of a shorter of the two parallel surfaces is contiguous the first pole piece and each non-parallel surface is at an obtuse angle to the shorter of the parallel surfaces, and
  a second pole piece connected to the longer of the two parallel surfaces of the pole cap and extending to the back gap, the second pole piece having a width at the air bearing surface smaller than the length of the longer parallel surface.

11. An inductive write head having a bottom magnetic pole having a tip region that extends from a substantially planar air bearing surface to a zero throat position and a back region that extends from the zero throat position to a back gap, a top magnetic pole having a tip region extending from the air bearing surface to the zero throat position and a paddle region that extends from the zero throat position to the back gap, and a layer of insulating material forming a gap at the air bearing surface sandwiched between the tip regions of the bottom and top magnetic poles, the top magnetic pole comprising:
  a first pole piece at the air bearing surface extending between the air bearing surface and the zero throat position contiguous the layer of insulating material and confronting the tip region of the bottom magnetic pole across the gap, the first pole piece having a width defining a gap width of the head at the air bearing surface, and
  second pole piece means connected to the first pole piece and extending to the back gap, at least a portion of the second pole piece means that is connected to the first pole piece having a width larger than the width of the first pole piece, the second pole piece means being connected to the first pole tip piece so that no sharp external corners exist between the first pole tip piece and the second pole piece within the pole tip region, wherein the second pole piece means is at least partially within the pole tip region and includes surfaces that intersect with surfaces of the first pole piece within the pole tip region at external corners, at least two surfaces of each external corner within the pole tip region being joined at an obtuse angle so that none of the external corners within the pole tip region is a sharp external corner, and wherein the second pole piece means comprises:
    a pole cap at the air bearing surface contiguous the first pole piece, the pole cap having a trapezoidal configuration at the air bearing surface forming two opposite substantially parallel surfaces of unequal length and two non-parallel surfaces between the two parallel surfaces, such that the length of a shorter of the two parallel surfaces is contiguous the first pole piece and each non-parallel surface is at an obtuse angle to the shorter of the parallel surfaces, and
    a second pole piece connected to the longer of the two parallel surfaces of the pole cap and extending to the back gap, the second pole piece having a width at the air bearing surface smaller than the length of the longer parallel surface.

12. An inductive write head having a top magnetic pole, the top magnetic pole comprising:
  a first pole piece at an air bearing surface of the write head, the first pole piece extending between the air bearing surface and a zero throat position of the write head, a width of the first pole piece defining a gap width of the write head at the air bearing surface;
  a pole cap at the air bearing surface contiguous the first pole piece, the pole cap having a trapezoidal configuration at the air bearing surface forming two opposite substantially parallel surfaces of unequal length and two non-parallel surfaces between the two parallel surfaces, such that the length of a shorter of the two parallel surfaces is contiguous the first pole piece and each non-parallel surface is at an obtuse angle to the shorter of the parallel surfaces; and
  a second pole piece connected to the longer of the two parallel surfaces of the pole cap and extending to a back gap, the second pole piece having a width at the air bearing surface smaller than the length of the longer parallel surface.

* * * * *

UNITED STATES PATENT AND TRADEMARK OFFICE
CERTIFICATE OF CORRECTION

PATENT NO. : 6,301,076 B1
DATED : October 9, 2001
INVENTOR(S) : Frank E. Stageberg et al.

It is certified that error appears in the above-identified patent and that said Letters Patent is hereby corrected as shown below:

Title page,
ABSTRACT,
Line 12, delete "corner", insert -- corners --

Column 1,
Line 26, delete "in" before the word most
Line 28, delete "lo" ,insert -- to --
Line 41, delete "wrilt", insert -- write. The --
Line 43, delete "coi, ciltioii", insert -- convention --

Column 2,
Line 50, delete "Bach", insert -- each --

Column 4,
Line 46, delete "sur faces" , insert -- surfaces --
Line 48, delete "flinge", insert -- fringe --

Column 5,
Line 20, delete "pentalloy", insert -- permalloy --
Line 38, delete ".", insert -- , --
Line 44, delete "overthe", insert -- over the --

Column 6,
Line 36, delete "arid", insert -- and --
Line 37, delete "Treater", insert -- greater --
Line 58, delete "confionting", insert -- confronting --
Line 60, delete "beating", insert -- bearing --

UNITED STATES PATENT AND TRADEMARK OFFICE
CERTIFICATE OF CORRECTION

PATENT NO. : 6,301,076 B1
DATED : October 9, 2001
INVENTOR(S) : Frank E. Stageberg et al.

It is certified that error appears in the above-identified patent and that said Letters Patent is hereby corrected as shown below:

<u>Column 7,</u>
Line 5, delete "fromt" insert -- from --
Line 38, delete "beating", insert -- bearing --

Signed and Sealed this

Fourth Day of June, 2002

*Attest:*

JAMES E. ROGAN
*Director of the United States Patent and Trademark Office*

*Attesting Officer*